United States Patent [19]

Rose

[11] 4,448,562

[45] May 15, 1984

[54] BELLOWS SEAL FOR BALL AND SOCKET JOINTS

[75] Inventor: John A. Rose, Ypsilanti, Mich.

[73] Assignee: O & S Manufacturing Company, Whitmore Lake, Mich.

[21] Appl. No.: 337,665

[22] Filed: Jan. 7, 1982

[51] Int. Cl.³ .................. F16C 11/00; F16D 1/12
[52] U.S. Cl. ...................... 403/134; 277/212 FB
[58] Field of Search .............. 403/134, 135, 50, 51, 403/76, 77, 90; 277/177, 212 FB

[56] References Cited

U.S. PATENT DOCUMENTS

| | | | |
|---|---|---|---|
| 2,397,464 | 4/1946 | Booth | 403/134 |
| 3,389,927 | 6/1968 | Herbenar | 403/51 X |
| 3,413,023 | 11/1968 | Herbenar | 403/135 |
| 4,154,546 | 5/1979 | Merrick et al. | 403/134 |
| 4,353,660 | 10/1982 | Parks | 403/135 X |

FOREIGN PATENT DOCUMENTS

| | | | |
|---|---|---|---|
| 2402491 | 8/1974 | Fed. Rep. of Germany | 403/134 |
| 920900 | 4/1947 | France | 403/134 |
| 1049887 | 11/1966 | United Kingdom | 403/134 |
| 1477649 | 6/1977 | United Kingdom | 403/134 |

Primary Examiner—Wayne L. Shedd
Attorney, Agent, or Firm—Hauke and Patalidis

[57] ABSTRACT

In a ball and socket joint comprising a ball and a socket in mutual swivelling sliding engagement with each other, the ball having a stud integrally formed at one end thereof and projecting outwardly through one end of the socket, the improvement consisting in forming the socket with an annular groove circularly disposed at the edge of the open end of the socket for fitting and retaining therein the beaded end of a flexible oil-resistant seal having a bellows type body provided at one end with an annular band stretched over the periphery of the stud.

6 Claims, 3 Drawing Figures

BELLOWS SEAL FOR BALL AND SOCKET JOINTS

BACKGROUND OF THE INVENTION

The present invention relates to a bellows seal for a ball and socket joint having improved means for sealing the same against entrance of foreign matter.

Ball and socket joints generally consist of a stud terminating in a ball member disposed in swivelling slidable engagement within a socket member having a concave spherical segment conforming to that of the ball. Ball and socket joints are commonly used in motor vehicle steering tie rod assemblies, in drag links, torque rods and like structures which, in service, are expossed to dust, dirty water splashes, mud and other foreign matter, and the joints are often provided with seals preventing entrance of foreign matter in the assembly. Bellows seals are generally used for preventing entrance of foreign matter between the bearing surfaces at the end of the socket from which a mounting stud projects, the mounting stud being welded to or formed integrally with a ball member having a partially spherical surface in the socket member. The bellows seals are made of flexible material, such as rubberized canvas, thin natural rubber or preferably synthetic rubber, neoprene, urethane and the like, an end of the bellows being disposed in tight engagement with a portion of the peripheral surface of the stud member, and the other end of the bellows being attached to the socket. Adhesive, garter springs, elastic O-rings, circular clamps and other fastening means have been used in the past for attaching bellows seals to socket members, but it has been found that most bellows seals become detached from the socket member during use in the field due to failure of the fastening means, often long before the bellows portion of the seal has deteriorated beyond normal usefulness.

SUMMARY OF THE INVENTION

The present invention remedies the shortcomings of prior art bellows seals by providing, in combination with a ball and socket joint which has an annular groove disposed around the exterior periphery of the socket for retaining the corresponding end of the bellows in place at the edge of the socket, a bellows seal having a reinforcing bead at the edge of the bellows fitted within the groove, and at least one edge of the groove folded over the bead.

Because of its excellent retention the bellows seal attachment arrangement of the invention is particularly useful for heavy duty applications, such as truck or tractor tie rods, drag links, torque rods and the like. In addition, the present invention provides a bellows seal for a swivel joint which is able to handle relatively large amounts of angular displacement between the joined elements.

Other objects and advantages of the present invention will become apparent to those skilled in the art when the following description of the best modes contemplated for practicing the invention is read in conjunction with the accompanying drawings wherein like numerals refer to like or equivalent parts and in which:

DETAILED DESCRIPTION OF THE PREFERRED EMBODIMENTS

Figure 1:
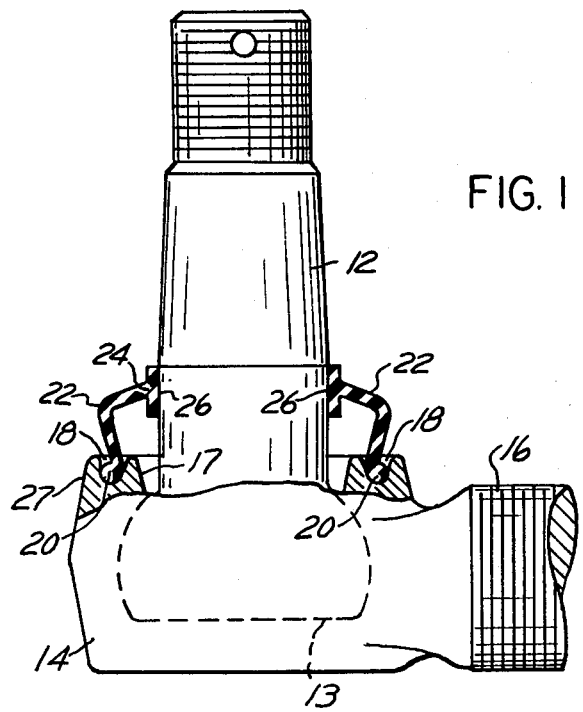
FIG. 1 is a side elevational view, with portions in section, of a swivel joint provided with a bellows seal fitted thereto according to the present invention, prior to final assembly.

Referring to the drawings in greater detail, the example of structure shown therein for a knuckle or swivel joint 10 is, for example, that disclosed generally in copending application Ser. No. 251,254, now U.S. Letters Patent No. 4,415,291, issued Nov. 15, 1983 assigned to the same assignee as the present application. The knuckle or swivel joint which, per se, forms no part of the present invention, consists of a cold-headed half ball 13 having a stud 12 integrally formed at one end thereof projecting from a socket in which the half ball 13 is disposed. The socket 14 has an integrally formed shank 16 projecting from the outside surface of the socket.

The socket 14, in the example of structure illustrated, has an open end 17, through which the stud 12 projects, which is provided at its edge with an annular groove 18 circularly disposed around its exterior periphery and within which is fitted an annular bead 20, preferably toroidal, that is substantially circular in section, which is formed integrally at the end edge of a flexible oil-resistant bellows seal 22. The bellows seal 22 has, at its other end edge, an annular garter flange 24 which is stretched around the periphery of the stud 12. The bellows seal 22 has a flexible bellows-type pleated tubular body extending between the end annular bead 20 and the end annular garter flange 24 so that, while its ends remain fast, it can be considerably twisted, stretched and compressed without injury thereto.

The annular groove 18 is made in the usual fashion by machining the edge of the open end 17 of the socket 14, or by forging, for example.

Figure 2:
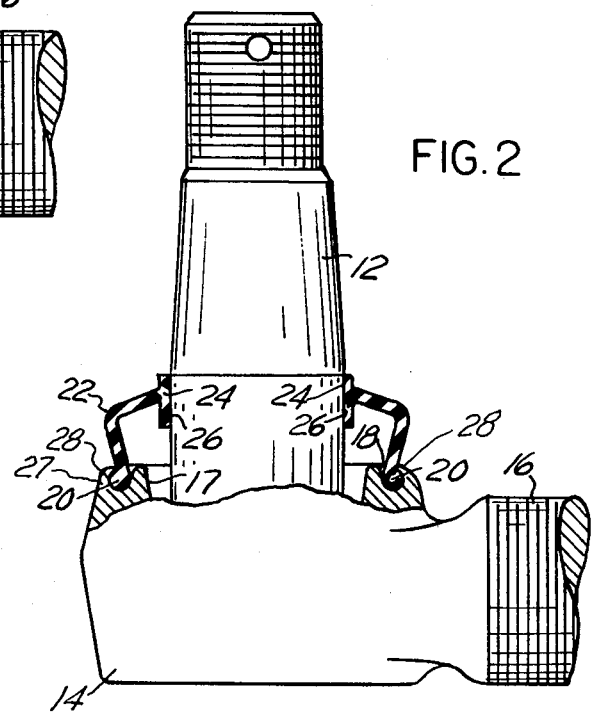
FIG. 2 is a view similar to FIG. 1 but showing the structure after final assembly.
Figure 3:
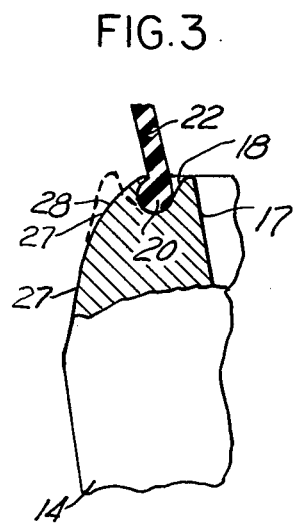
FIG. 3 is an enlarged view of a portion thereof.

The bellows seal 22 is installed by disposing the bellows seal over the stud 12, with the edge end of the bellows seal provided with the integral edge annular bead 20 directed toward the annular groove 18 circularly disposed in the exterior periphery of the socket 14. The annular garter flange 24 at the end edge of the bellows seal pleated body being elastically stretchable, the inner surface 26 of the seal annular garter flange 24 firmly engages the peripheral surface of the stud 12. The other end of the bellows seal pleated body 22 provided with the integral annular bead 20 is fitted within the annular groove 18. As shown particularly at FIGS. 2 and 3, if desired the exterior wall 27 of the annular groove 18 after insertion of the bellows seal bead 20 within the groove 18, is bent over as shown at 28, with the result that the bellows seal annular bead 20 is partially encased within the annular groove 18.

It will be obvious to those skilled in the art that the groove 18 is preferably only partially closed at its top so that the bellows seal can be removed from the socket 14 if necessary for repacking the joint with lubricant or for replacing a damaged bellows seal. One method of folding or bending over a wall of the groove 18 at the end of the manufacturing process is by way of a swaging die. The swaging die alters the shape of the exterior wall 27 of the groove 18 from that shown in dotted line at FIG. 3 to that shown in full lines at 28.

The bellows seal 22 is made of a convenient elastomeric, or elastic and stretchable material, preferably of molded neoprene or urethane having a relatively thin wall, and the interior of the bellows seal 22 may be advantageously pre-packed with grease.

It will be appreciated that the bellows seal anchoring means of the invention has useful applications to structures other than the specific ball and socket joint structure illustrated and disclosed herein.

It will thus be seen that there has been provided by the present invention an improvement in bellows seals anchoring means for ball and socket joints, for example, in which the object hereinabove set forth, together with many other practical advantages, has been successfully achieved. While a preferred embodiment of the present invention has been shown and described, it is to be understood that variations and changes may be resorted to without departing from the spirit of the present invention as defined in the appended claims.

I claim:

1. In a ball and socket joint comprising a ball and socket in mutual swivelling sliding engagement, said ball having a stud integrally formed therewith projecting outwardly through one end of said socket, and means holding said ball in said socket, the improvement comprising an annular groove disposed around the exterior periphery of said socket at said end of the socket from which said stud projects, said annular groove having a pair of lateral walls, and a resilient tubular body disposed around said stud, said resilient tubular body having an open end stretched around said stud and another open end provided with an integral reinforcing bead fitted within said annular groove, wherein said annular groove is partially closed by at least one lateral wall of said groove being bent over and folded over said bead such as to hold said bead within said groove.

2. The improvement of claim 1 wherein said reinforcing bead is substantially toroidal.

3. The improvement of claim 2 wherein said tubular member is formed as a bellows.

4. In a structure comprising an elongated member projecting from a housing, an improvement comprising said housing having an annular groove disposed around the exterior periphery of the housing, said annular groove having a pair of lateral walls, and a resilient tubular member disposed around said elongated member, said tubular member having an open end stretched around said elongated member and another open end provided with an integral reinforcing bead fitted within said annular groove, wherein said annular groove is partially closed by at least one lateral wall of said groove being bent over and folded over said bead such as to hold said bead within said groove.

5. The improvement of claim 4 wherein said reinforcing bead is substantially toroidal.

6. The improvement of claim 5 wherein said tubular member is formed as a bellows.

* * * * *